UNITED STATES PATENT OFFICE.

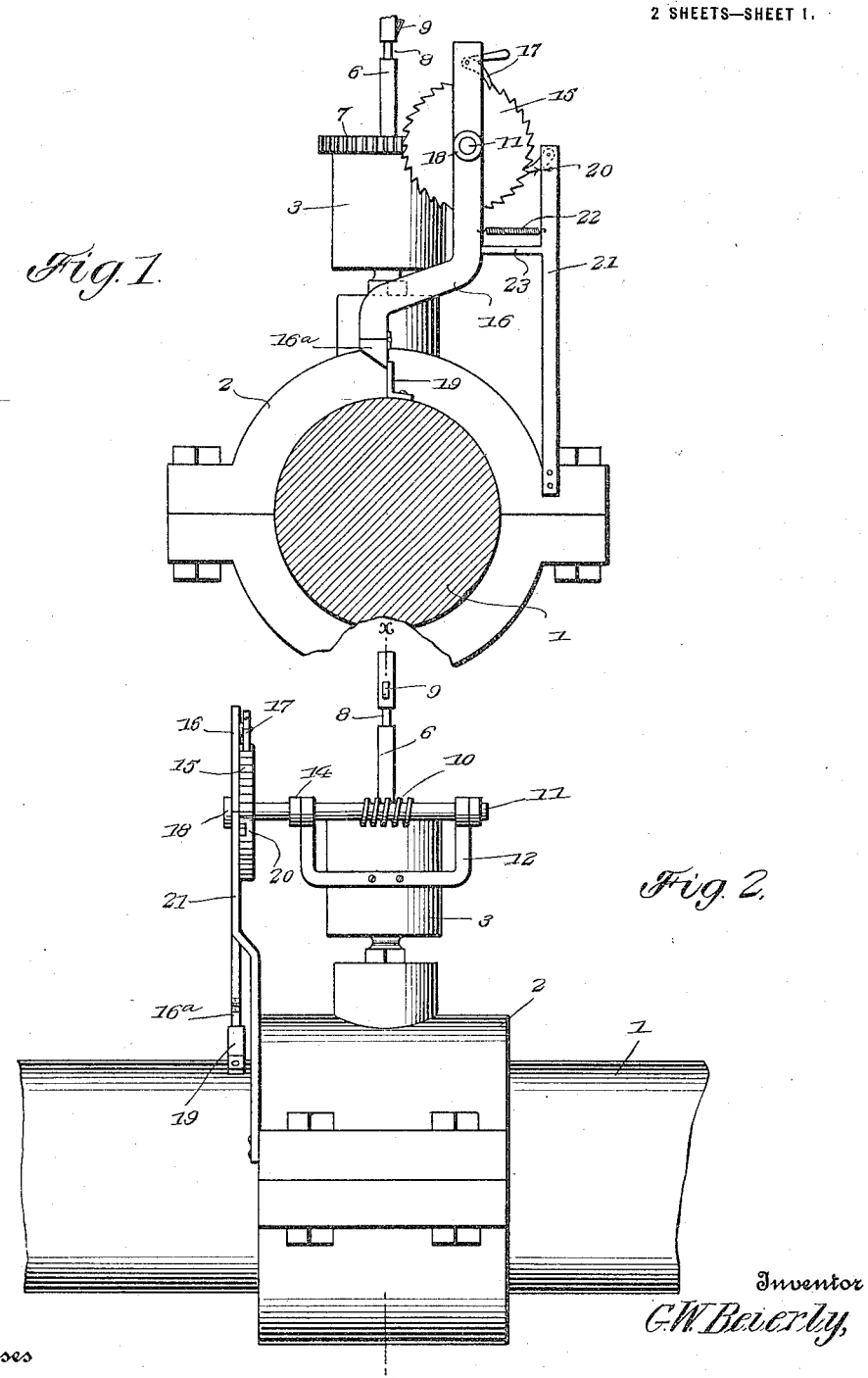

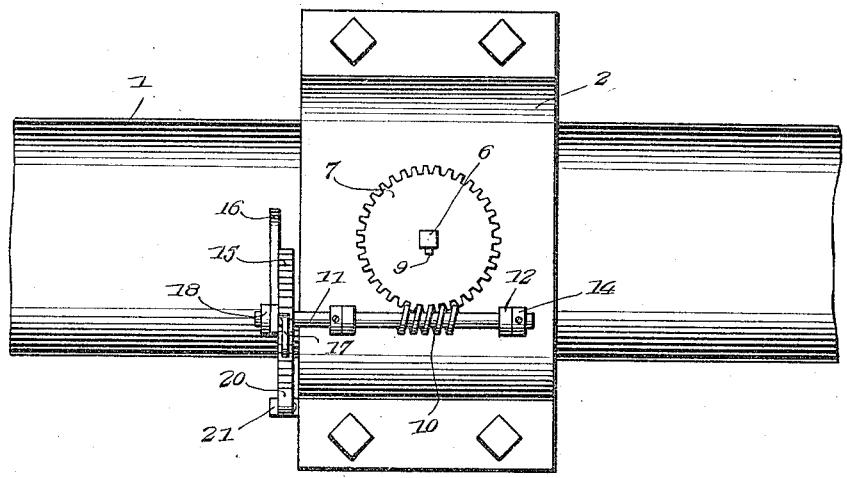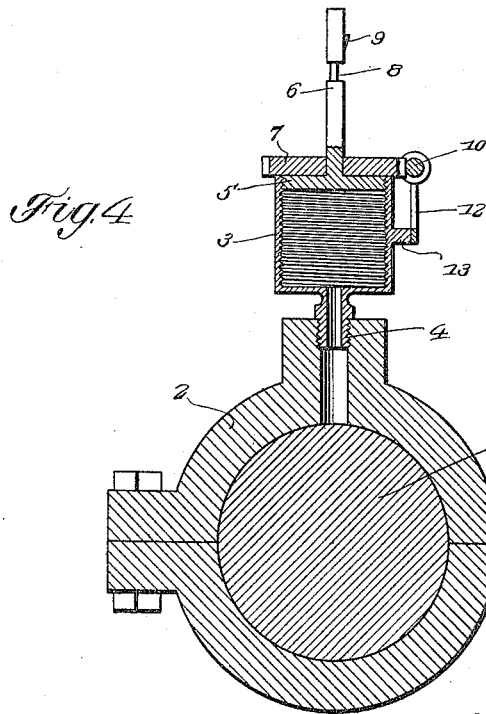

GEORGE W. BEIERLY, OF MILWAUKEE, WISCONSIN.

SELF-FEEDING GREASE-CUP.

1,148,431.     Specification of Letters Patent.     Patented July 27, 1915.

Application filed January 31, 1914. Serial No. 815,774.

*To all whom it may concern:*

Be it known that I, GEORGE W. BEIERLY, a citizen of the United States, residing at Milwaukee, in the county of Milwaukee and State of Wisconsin, have invented new and useful Improvements in Self-Feeding Grease-Cups, of which the following is a specification.

The present invention has relation to lubricators, and more particularly to grease cups which require the grease to be positively fed from the cup or container, the purpose being to provide a lubricator of this character which embodies novel actuating means for insuring a positive feed of the lubricant when the machinery is in motion but which will not waste the grease when the parts are at rest.

The invention consists of a cup or container for receiving the grease or other lubricant, a plunger arranged to operate within such cup and positively moved by means of a screw thread, a worm gearing for rotating the plunger, said worm gearing embodying an element through which the stem of the plunger is adapted to move, and means for operating the worm gearing at such a rate of speed as to insure proper and positive feed of the lubricant to the moving part.

The invention also consists of means applied to the stem of the plunger to engage with and hold the gear element out of mesh with its companion gear when returning the plunger to normal position or removing the same from the cup to admit of replenishing such cup when the same becomes necessary.

The invention also consists of means whereby the plunger operating gearing is automatically thrown out of action when the plunger has nearly reached the limit of its feeding movement, thereby preventing injury to the working parts.

The invention further consists of the novel features, details of construction and combination of parts, which hereinafter will be more particularly set forth, illustrated and claimed.

In the accompanying drawings hereto attached Figure 1 is a view in elevation of a lubricator embodying the invention showing the same in operative relation. Fig. 2 is a view of the lubricator as seen when viewed from the right in Fig. 1. Fig. 3 is a top plan view. Fig. 4 is a section on the line $x$—$x$ of Fig. 2.

Corresponding and like parts are referred to in the following description, and indicated in all the views of the drawings, by the same reference characters.

The numeral 1 designates a shaft and 2 a bearing therefor.

The lubricator embodies a cup or like receptacle or container 3 which is adapted to receive the grease or other lubricant to be supplied to the bearing or moving part. The cup 3 is provided with the usual threaded stem 4 which makes connection with the bearing 2 or like part. A plunger 5 is arranged to operate within the cup 3 to forcibly expel the lubricant therefrom. The inner wall of the cup is screw threaded and the outer edge of the plunger is formed with a matching screw thread and rotation of the plunger serves to advance or withdraw the same according to the direction of rotation. The stem 6 of the plunger is rotatable therewith and is of non-circular form in cross section to feed a corresponding opening formed in the center of a work gear 7 which is arranged to rest upon the top of the cup 3 and close the same thereby acting in the capacity of a cover. An annular groove 8 is formed in the stem 6 of the plunger at such a point as to register with the worm gear 7 when the plunger is near the limit of its downward movement, thereby admitting of the worm gear turning without imparting any rotary movement to the stem 6 or plunger 5. A spring detent 9 is fitted to a side of the stem 6 and is preferably let into a recess formed in a side of such stem. The spring 9 acts as a detent to engage with the worm gear 7 when the latter is moved upward upon the stem, thereby holding the worm gear out of mesh with its companion gear to admit of rotating the stem 6 and plunger 5 backward to withdraw the plunger from the cup to admit of the latter being replenished. After the cup has been properly supplied with lubricant the worm gear 7 is moved downward into engagement with the top of the cup to close the same and to bring its threaded segments or cogs in mesh with the thread of the worm 10 constituting the companion gear.

A shaft 11 is provided with the worm 10 which may be fitted thereto or formed therewith and is mounted in a bracket 12 which is secured to a lug 13 forming a part of the cup 3. Longitudinal movement of the shaft 11 is prevented by suitable set collars 14. The shaft 11 is adapted to be rotated at any predetermined speed to insure a proper and positive feed of lubricant. Rotation of the shaft 11 causes the worm 10 and worm gear 7 to rotate and a movement is imparted to the stem 6 and plunger 5, the latter being advanced by reason of a screw thread connection with the inner wall of the cup 3.

A ratchet wheel 15 is secured to the shaft 11 and is adapted to have an intermittent movement imparted thereto by means of a lever 16 and dog 17, the latter being pivoted to the lever 16 and held in engagement with the teeth of the ratchet wheel 15. The lever 16 is mounted upon the shaft 11 which is retained in place by means of a set collar 18. The lower end of the lever 16 is adapted to be engaged by means of a trip 19 attached to the shaft 1. To prevent injury to the parts in event of the shaft 1 being driven in a reverse direction the lower end of the lever 16 has a portion 16ª pivoted thereto, the joint being formed in such a manner as to cause the part 16ª to move with the lever 16 when the shaft 1 is driven in the usual direction. Backward rotation of the ratchet wheel 15 is prevented by means of a dog 20 attached to the upper end of a standard 21 rising from the bearing 2 or other convenient part of the machinery. A contractile spring 22 is interposed between the lower part of the lever 16 and the standard 21 and returns the lever to normal position after the same has been actuated by the stop 17 and clears such stop. A rod 23 projecting from the standard 21 engages the lever 16 and holds the same in a given position.

The operation of the lubricator is as follows: The cup 3 is supplied with grease or like lubricant and the plunger 5 is fitted into the upper portion of the cup, the parts being in the position substantially as indicated in the drawings. When the shaft 1 is rotating the stop 17 engaging with the lower end of the lever 16 imparts a step by step movement to the ratchet wheel 15 and the plunger 5 is caused to turn slowly by reason of the intermediate gearing substantially as set forth. It is to be understood that the gearing is of such a nature as to effect a proper feed of the lubricant without entailing any waste. When the machine is at rest no lubricant is fed, hence there is no waste of the grease. When the plunger has nearly reached the bottom of the cup the grooved portion 8 of the stem 6 comes in register with the worm gear 7 thereby admitting of the latter turning without imparting further movement to the plunger and as a result no damage is sustained by the working parts of the lubricator. When it is required to replenish the cup the worm gear 7 is moved upward upon the stem 6 until engaged by the detent 9. This results in disengaging the worm gear 7 from the worm 10, hence the plunger may be rotated backward and removed from the cup to admit of a proper supply of grease or lubricant being placed in the cup after which the worm gear 7 is moved downward upon the stem 6 to close the cup and bring its thread sections in engagement with the thread of the worm 10.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention what is claimed as new, is:—

1. In a lubricator of the character specified, the combination of a cup having its inner wall screw-threaded, a plunger arranged within the cup and having screw-threaded engagement with the inner wall thereof, a stem projecting from the plunger and having a reduced portion, a spring detent fitted to the side of the stem and let into a recess formed in one side of said stem, a gear wheel for closing the top of the cup and fitted upon the stem of the plunger to turn therewith except when in register with the reduced portion of such stem which occurs when the plunger is about at the limit of its forward movement, said detent engaging the gear wheel upon the upward movement thereof, and means for imparting rotary movement to the gear wheel.

2. In a lubricator of the character specified, the combination of a cup having its inner wall screw-threaded, a plunger arranged within the cup and having screw-thread engagement with the inner wall thereof, a stem projecting from the plunger and having a reduced portion, a spring detent fitted to the side of the stem and let into a recess formed in one side of said stem, a gear wheel for closing the top of the cup and fitted upon the stem of the plunger to turn therewith except when in register with the reduced portion of such stem, which occurs when the plunger is about at the limit of its forward movement, a worm gearing for imparting rotary movement to the gear wheel and mechanism for operating the worm gearing.

In testimony whereof I affix my signature in presence of two witnesses.

GEORGE W. BEIERLY.

Witnesses:
W. H. RAYMOND,
R. B. HENNING.